(12) United States Patent
Maeshima et al.

(10) Patent No.: US 11,485,148 B2
(45) Date of Patent: Nov. 1, 2022

(54) PRINTER AND CONTROL METHOD OF PRINTER

(71) Applicant: SEIKO EPSON CORPORATION, Tokyo (JP)

(72) Inventors: Hidetoshi Maeshima, Shiojiri (JP); Sadaaki Horiuchi, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 216 days.

(21) Appl. No.: 16/856,800

(22) Filed: Apr. 23, 2020

(65) Prior Publication Data
US 2020/0338904 A1 Oct. 29, 2020

(30) Foreign Application Priority Data
Apr. 25, 2019 (JP) .............................. JP2019-083768

(51) Int. Cl.
| | |
|---|---|
| *B41J 3/00* | (2006.01) |
| *B41J 3/407* | (2006.01) |
| *B41J 2/045* | (2006.01) |
| *B41J 11/00* | (2006.01) |
| *G06F 3/12* | (2006.01) |
| *B41J 3/54* | (2006.01) |
| *H04N 1/00* | (2006.01) |

(52) U.S. Cl.
CPC ......... *B41J 3/4071* (2013.01); *B41J 2/04501* (2013.01); *B41J 3/4075* (2013.01); *B41J 3/54* (2013.01); *B41J 11/008* (2013.01); *G06F 3/125* (2013.01); *G06F 3/1242* (2013.01); *H04N 1/00687* (2013.01); *H04N 1/00702* (2013.01)

(58) Field of Classification Search
CPC .............................. B41J 3/4071; B41J 3/4075
See application file for complete search history.

(56) References Cited

U.S. PATENT DOCUMENTS

2006/0078364 A1* 4/2006 Kimura .................. B41J 11/703
400/621

FOREIGN PATENT DOCUMENTS

JP 2013-191253 9/2013

* cited by examiner

*Primary Examiner* — Ibrahim Siddo
(74) *Attorney, Agent, or Firm* — Workman Nydegger (57) ABSTRACT

A publisher configured to record data on a medium by a first media drive and a second media drive and including a publisher controller and a publisher storage, the publisher controller being configured to detect a type of a medium on which data is recordable by the first media drive and detect a type of a medium on which data is recordable by the second media drive, the type of the medium on which data is recordable by the first media drive and the second media drive being defined as a recording target type, the type of a medium on which data is recordable by only any one of the first media drive and the second media drive being defined as a non-recording target type, and the publisher being configured to store target type information representing the recording target type and the non-recording target type.

5 Claims, 8 Drawing Sheets

PRINTER AND CONTROL METHOD OF PRINTER

The present application is based on, and claims priority from JP Application Serial Number 2019-083768, filed Apr. 25, 2019, the disclosure of which is hereby incorporated by reference herein in its entirety.

BACKGROUND

1. Technical Field

The present disclosure relates to a printer and a control method of the printer.

2. Related Art

Techniques are known for performing data processing on data recording media such as compact discs (CDs), digital versatile discs (DVDs), and Blu-ray (registered trademark) discs (BDs). For example, JP-A-2013-191253 discloses a publisher including a plurality of media drives serving as data recorders configured to perform data processing on recording surfaces of CDs, DVDs, or BDs.

In general, for a data recorder such as the media drive as described in JP-A-2013-191253, the type of a data recording medium (for example, CD, DVD, or BD) on which data is processable is specified. Thus, in a device such as the publisher described in JP-A-2013-191253, the type of the data recording medium on which data is processable may be different between a plurality of data recorders. In this case, for example, when a data recording medium which is processable by a data recorder but which is unprocessable by another data recorder is defined as a recording target of data, the data recording medium has to be processed by only the one data recorder, and thus, the entire process becomes complicated, and the process efficiency may be reduced.

SUMMARY

One aspect of the present disclosure is a printer configured to perform data processing on a data recording medium by a first data recorder and a second data recorder, the printer including a controller configured to control the first data recorder and the second data recorder, the controller being configured to acquire, as a target medium, a data recording medium which is a process target of both the first data recorder and the second data recorder and acquire, as a non-target medium, a data recording medium which is not a process target of at least one of the first data recorder or the second data recorder.

In the printer, the controller may be configured to, when the first data recorder is replaced with a third data recorder, acquire, as a target medium, a data recording medium which is a process target of both the second data recorder and the third data recorder and acquire, as a non-target medium, a data recording medium which is not a process target of at least one of the second data recorder or the third data recorder.

In the printer, the controller may be configured to, when the controller receives a request of processing of data by the first data recorder and the second data recorder, output information that the processing of data is executable when the request of the processing is a request of processing of the target medium, and output information that the processing of data is inexecutable when the request of the processing is a request of processing of the non-target medium.

Another aspect of the present disclosure is a control method of a printer configured to perform data processing on a data recording medium by a first data recorder and a second data recorder, the control method including: acquiring, as a target medium, the data recording medium which is a process target of both the first data recorder and the second data recorder; and acquiring, as a non-target medium, the data recording medium which is not a process target of at least one of the first data recorder or the second data recorder.

DESCRIPTION OF EXEMPLARY EMBODIMENTS

First Embodiment

Figure 1:
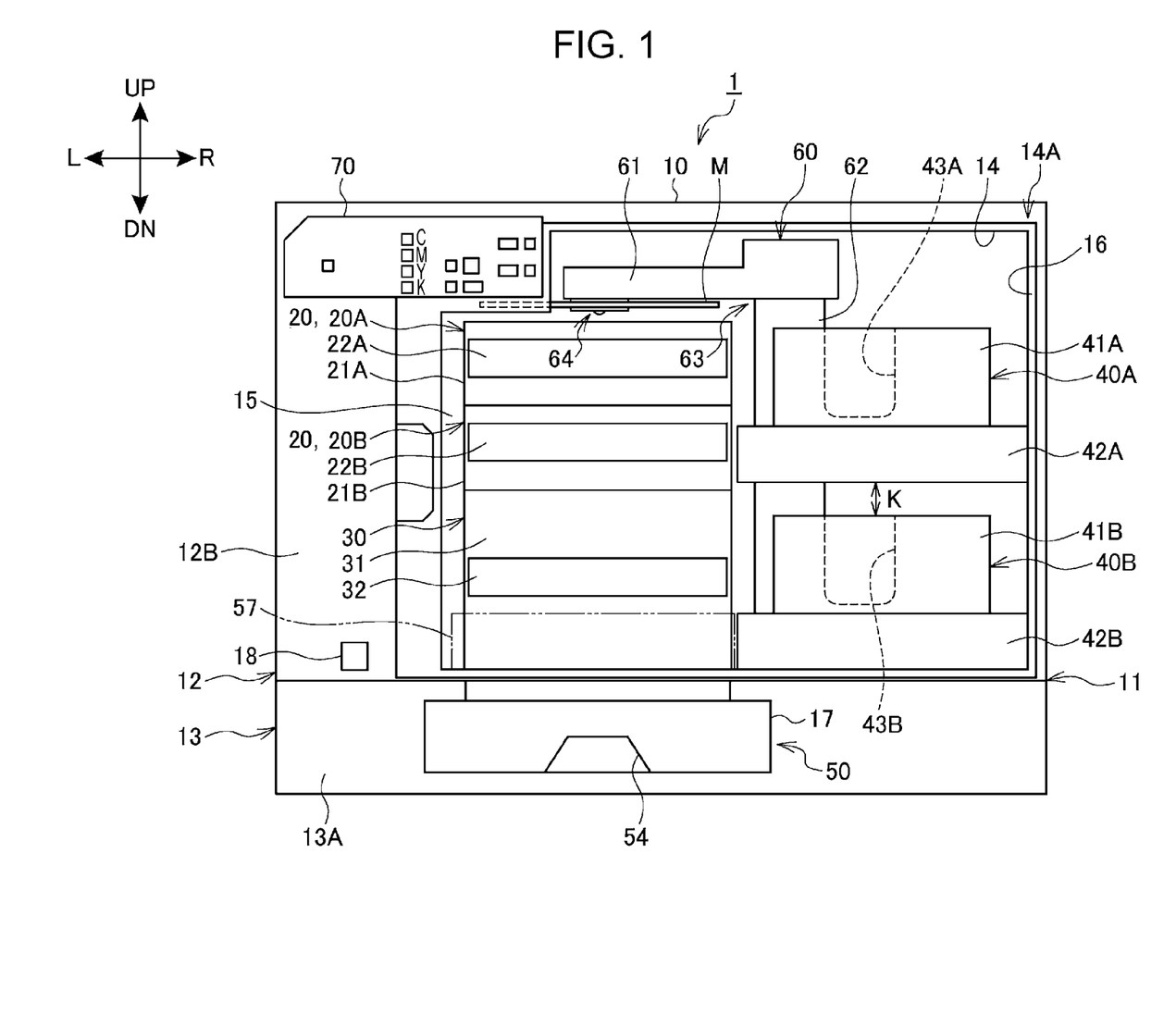
FIG. 1 is a front view illustrating a configuration of a publisher.
Figure 2:
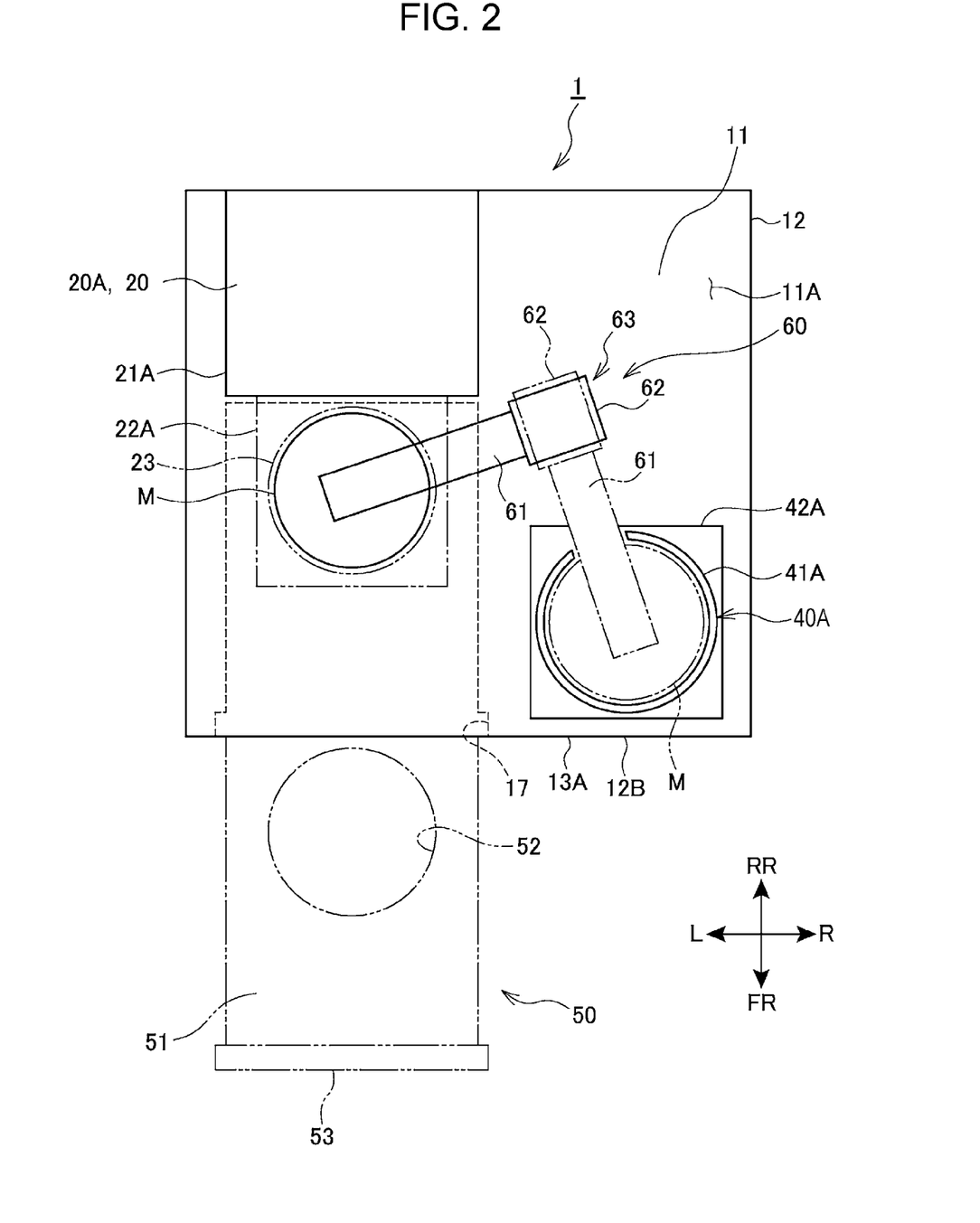
FIG. 2 is a plan view illustrating an interior of a housing of the publisher viewed from above.

Next, a first embodiment will be described. FIG. 1 is a front view illustrating a configuration of a publisher 1. FIG. 2 is a plan view illustrating an interior of a housing 10 of the publisher 1 viewed from above. The publisher 1 corresponds to an example of a recording medium processor and a printer.

Here, a front direction of the publisher 1 in an installation state is indicated by symbol FR. A rear direction of the publisher is indicated by symbol RR. A right direction of the publisher 1 is indicated by symbol R, a left direction is indicated by symbol L, an upward direction is indicated by symbol UP, and a downward direction is indicated by symbol DN. These directions are common in FIGS. 1 and 2.

The publisher 1 is a device which executes processes, for example, including writing of data to a medium M such as a CD, a DVD, or a BD having a disk shape, reading of data from the medium M, and printing of an image onto a label surface of the medium M. The medium M corresponds to an example of a data recording medium.

As illustrated in FIG. 1, the interior of the housing 10 of the publisher 1 is partitioned by a partition 11 in the upward and downward directions. In the following description, a part above the partition 11 of the housing 10 is referred to as a "housing upper portion" and is denoted by symbol "12", and a part under the partition 11 of the housing 10 is referred to as a "housing lower portion" and is denoted by symbol "13".

In the housing upper portion 12 are provided two media drives 20, namely, a first media drive 20A and a second media drive 20B, a label printer 30, a first stacker 40A, a second stacker 40B, and a transporter 60. The first media drive 20A corresponds to an example of a first data recorder. The second media drive 20B corresponds to an example of a second data recorder.

The first media drive 20A is an apparatus configured to irradiate a recording surface of a medium M with a laser beam to record (write) data and read data. For example, when the first media drive 20A is an apparatus corresponding to a CD and a DVD, the first media drive 20A includes a recording head which outputs laser beams having wavelengths each correspond to the CD and the DVD. The first media drive 20A includes a media drive body 21A and a drive tray 22A which is a tray configured to be pulled out in the forward and rearward directions with respect to the media drive body 21A. The drive tray 22A has an upper surface in which a recess 23 having a substantially circular shape is formed. In the recess 23, the medium M is to be mounted. The drive tray 22A is movable in the forward and rearward directions between a process location where data is recorded on and read from the medium M and a reception-and-delivery location where the medium M is received and delivered by an arm 61 of a transporter 60. Note that FIG. 2 shows a drive tray 22A which is located in a reception location and on which the medium M is mounted.

The second media drive 20B is an apparatus configured to irradiate a recording surface of a medium M with a laser beam to record data and read data. For example, when the second media drive 20B is an apparatus corresponding to a CD, a DVD, and a BD, the second media drive 20B includes a recording head which outputs laser beams having wavelengths each corresponding to the CD, the DVD, and the BD. The second media drive 20B includes a media drive body 21B and a drive tray 22B which is a tray configured to be pulled out in the forward and rearward directions with respect to the media drive body 21B. The drive tray 22B has an upper surface in which a recess having a substantially circular shape is formed in a similar manner to the drive tray 22A. In the recess, the medium M is to be mounted. The drive tray 22B is movable in the forward and rearward directions between the process location where data is recorded on and read from the medium M and the reception-and-delivery location where the medium M is received and delivered by the arm 61 of the transporter 60.

The label printer 30 includes a carriage 301 which scans in the left and right directions, an ink jet head 302 mounted on the carriage 301, and the like, and the label printer 30 prints an image onto a label surface of a medium M. The label printer 30 includes a printer body 31 and a printer tray 32 which is a tray configured to be pulled out with respect to the printer body 31. The printer tray 32 has a recess having a substantially circular shape and formed in a similar manner to the drive trays 22A and 22B. In the recess, the medium M is to be mounted. The printer tray 32 is configured to be movable in the forward and rearward directions between a print location where an image is to be printed onto the label surface of the medium M and the reception-and-delivery location where the medium M is received and delivered by the arm 61 of the transporter 60.

The first media drive 20A, the second media drive 20B, and the label printer 30 are provided in the housing upper portion 12 in the back left direction of a guide 62, which will be described later, to be aligned in a line in the upward and downward directions. Specifically, the first media drive 20A, the second media drive 20B, and the label printer 30 are provided in housing upper portion 12 to be aligned in the upward and downward directions such that the center axis of the medium M to be mounted on the drive tray 22A located in the reception location, the center axis of the medium M to be mounted on the drive tray 22B located in the reception location, and the center axis of the medium M mounted on the printer tray 32 located in the reception location are the same axes.

As illustrated in FIG. 1, in the housing upper portion 12 are provided a first stacker 40A and a second stacker 40B as accommodation units each accommodate media M.

The first stacker 40A includes a first stacker accommodation unit 41A having a cylindrical shape and configured to accommodate, for example, about several tens of media M in a stacked state. In the interior of the housing 10, the first stacker accommodation unit 41A is attachably and detachably supported by a first stacker base 42A fixed to the housing 10. The first stacker accommodation unit 41A has an external wall part of which has a cutout 43A formed as a downwardly elongated cutout. The cutout 43A enables the arm 61 of the transporter 60 to proceed to a lower portion of the first stacker accommodation unit 41A.

The second stacker 40B includes a second stacker accommodation unit 41B having a cylindrical shape and configured to accommodate, for example, about several tens of media M in a stacked state. In the interior of the housing 10, the second stacker accommodation unit 41B is attachably and detachably supported by a second stacker base 42B fixed to the housing 10. Moreover, the second stacker base 42B is attachably and detachably supported by the second stacker base 42B with a gap K thorough which the arm 61 of the transporter 60 is insertable being formed under the first stacker 40A between an upper end of the second stacker accommodation unit 41B and a lower surface of the first stacker base 42A. The second stacker accommodation unit 41B has an external wall part of which has a cutout 43B formed as a downwardly elongated cutout. The cutout 43B enables the arm 61 of the transporter 60 to proceed to a lower portion of the second stacker accommodation unit 41B.

As illustrated in FIGS. 1 and 2, the first stacker 40A and the second stacker 40B are provided in the housing upper portion 12 in the front right direction of the guide 62, which will be described later, to be aligned in a line in the upward and downward directions. Specifically, the first stacker 40A and the second stacker 40B are provided in the housing upper portion 12 to be aligned in the upward and downward directions such that the center axes of the media M to be accommodated are the same axes.

Moreover, as illustrated in FIGS. 1 and 2, in the housing upper portion 12 is provided the transporter 60 configured to transport a medium M among the first stacker 40A, the second stacker 40B, a third stacker 50, the first media drive 20A, the second media drive 20B, and the label printer 30.

The porter 60 includes the arm 61 and the guide 62 which supports the arm 61. The guide 62 is provided in the rearward direction of the first stacker 40A and the second stacker 40B and in the right direction of the first media drive 20A, the second media drive 20B, and the label printer 30. The guide 62 has an elongated rod shape and is provided to rise from an upper surface 11A of the partition 11. The arm 61 is supported by an arm driver 63 configured to move in the upward and downward directions along an axial direction of the guide 62 and to pivot about the axis of the guide 62 as the center. Moreover, the arm 61 has a tip end provided with a media holder 64 which releasably holds the medium M.

The arm driver 63 is provided with an arm detecting sensor configured to detect a location of the arm driver 63 in the upward and downward directions of the guide 62 and a pivot location of the arm driver 63 with the axis of the guide 62 as the center. The arm detecting sensor is omitted in the drawings. Based on the location of the arm driver 63 on the guide 62 detected by the arm detecting sensor, a publisher controller 100 which will be described later is configured to detect the location of the medium M held by the media holder 64.

Moreover, as illustrated in FIGS. 1 and 2, the housing upper portion 12 has a space formed to transport the medium M in the upward and downward directions by the transporter 60. The gap is located at a location in the left direction of the first stacker 40A and the second stacker 40B and in the forward direction of the first media drive 20A, the second media drive 20B, and the label printer 30. The third stacker 50 which will be described later is provided under the space.

Moreover, as illustrated in FIG. 1, the housing upper portion 12 has a front surface 12B in which an opening 14 is formed. In front of the opening 14 is provided a door 15 supported to be freely pivotable with respect to the door axis 16 provided at a right end 14A of the opening 14. When the publisher 1 detects that the door 15 is in a closed state with respect to the opening 14, the publisher 1 is configured to allow operation of the first media drive 20A, the second media drive 20B, the label printer 30, and the transporter 60. Note that when the publisher 1 detects that the door 15 is in an open state with respect to the opening 14, the publisher 1 is configured to stop operation of the first media drive 20A, the second media drive 20B, the label printer 30, and the transporter 60.

On the front surface 12B of the housing upper portion 12, a power source switch 18 configured to turn on/off a power source of the publisher 1 is provided at a bottom left section as viewed from the front in FIG. 1, and a notifier 70 configured to perform notification of various states of the publisher 1 is provided at an upper left section as viewed from the front in FIG. 1.

The notifier 70 includes an LED corresponding to, for example, a notification content and is configured to perform notification of the various states by changing the lighting state of the LED. For example, the notifier 70 performs notification of on/off state of the power source of the publisher 1. Moreover, for example, the notifier 70 performs notification of remaining ink amounts for each color in the label printer 30.

As illustrated in FIG. 1, the third stacker 50 as an accommodation unit for accommodating media M is provided in the housing lower portion 13 such that the third stacker 50 can be pulled out through a pullout port 17 formed in a front surface 13A of the housing lower portion 13. The third stacker 50 is configured such that also when the door 15 is in the closed state, the third stacker 50 is pulled out through the pullout port 17 so that the media M are put in or taken out of the third stacker 50. That is, also when the first media drive 20A, the second media drive 20B, the label printer 30, and the transporter 60 are in an operation state, a user may pull out the third stacker 50 through the pullout port 17 to put in and take out the media M in the third stacker 50.

The third stacker 50 is provided under and to be aligned with the first media drive 20A, the second media drive 20B, and the label printer 30. The third stacker 50 includes a third stacker accommodation unit 51 configured to be pulled out in front of the housing 10 through the pullout port 17 formed in the front surface 13A of the housing lower portion 13. The third stacker accommodation unit 51 has a recess 52 in which media M are accommodated in a stacked state and which has a substantially circular shape, and in the recess 52, several pieces of media M may be accommodated. Moreover, as illustrated in FIG. 1, the third stacker 50 has a front surface 53 provided with a handle 54 which may be held by a user when the user frontward pulls the third stacker accommodation unit 51 from the housing 10.

As indicated by the long dashed double-short dashed line in FIG. 1, the third stacker 50 is configured such that an additional stacker 57 is attachable to the third stacker 50. The additional stacker 57 has a bottomed cylindrical shape to be able to accommodate media M in a stacked state. Attaching the additional stacker 57 to the third stacker 50 enables the number of media M which may be accommodated in the third stacker 50 to be increased from several pieces to several tens of pieces.

Figure 3:
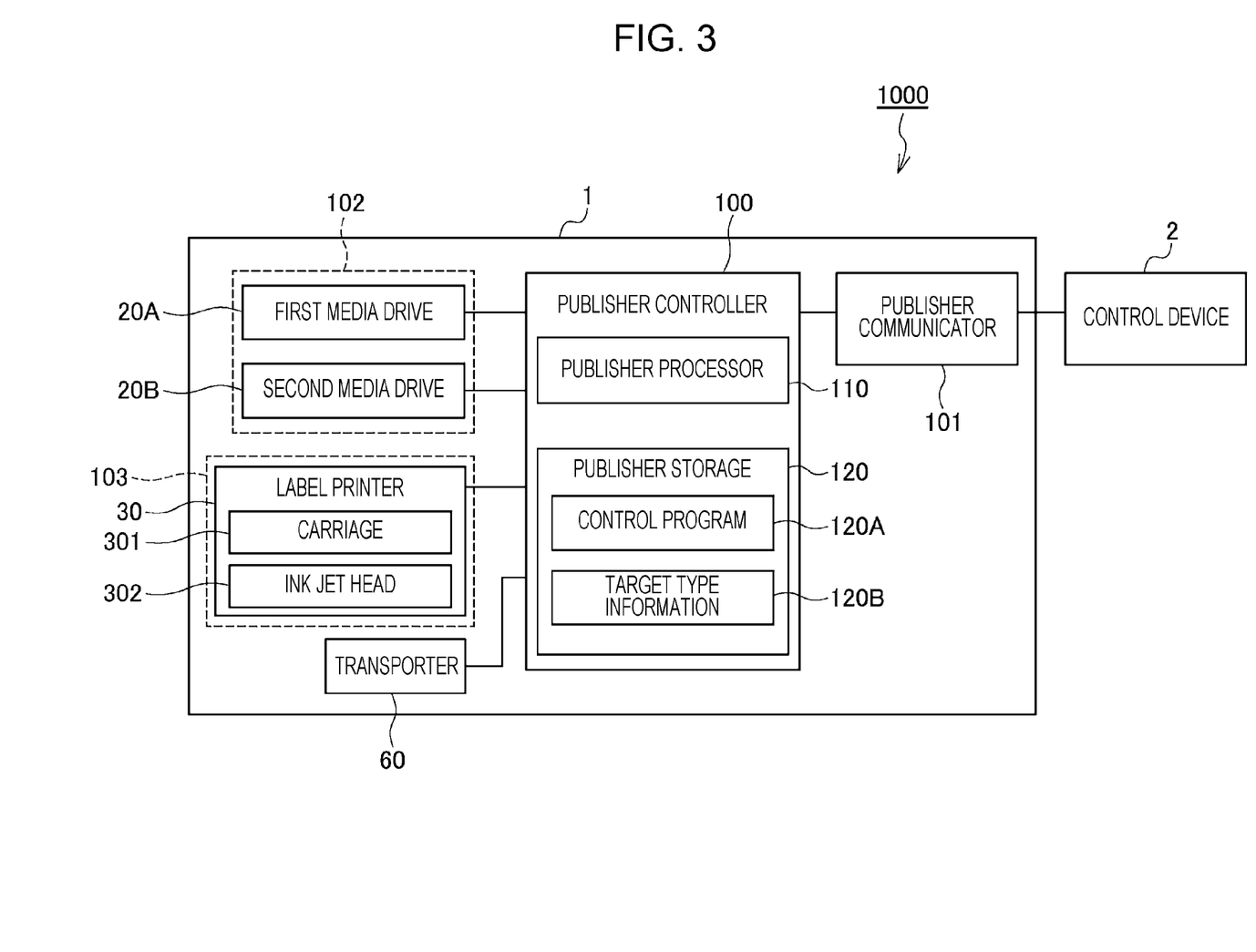
FIG. 3 is a view illustrating a functional configuration of the publisher.

FIG. 3 is a view illustrating a functional configuration of the publisher 1. As illustrated in FIG. 3, the publisher 1 is, together with a control device 2, included in a media processing system 1000. The media processing system 1000 of the present embodiment records data on a medium M having a recording surface on which no data is recorded, reads data from a medium M having a recording surface on which data is recorded, and in addition, executes printing of a label surface by the publisher 1 and the control device 2 to issue one or a plurality of media M having recording surfaces on which data is recorded.

In the following description, a medium M having a recording surface on which no data is recorded is referred to as a "blank medium" and is denoted by symbol "MB". A medium M having a label surface on which an image is printed and a recording surface on which data is recorded is referred to as a "processed medium" and is demoted by symbol "MS".

The publisher 1 includes a publisher controller 100, a publisher communicator 101, a data recorder 102, a printing unit 103, and a transporter 60. The publisher controller 100 corresponds to an example of a controller.

The publisher controller 100 includes: a publisher processor 110 which is a processor such as CPU or MPU configured to execute a program; and a publisher storage 120 to control components in the publisher 1. The publisher storage 120 corresponds to an example of a storage. The publisher controller 100 executes various processes through cooperation of hardware and software such that the publisher processor 110 reads a control program 120A stored in the publisher storage 120 so as to execute a process.

The publisher storage 120 includes a storage area which stores programs to be executed by the publisher processor 110 and data to be processed by the publisher processor 110. The publisher storage 120 stores a control program 120A which is a control program to be executed by the publisher processor 110 and various other types of data. Moreover, the publisher storage 120 stores target type information 120B (target information). The publisher storage 120 includes a non-volatile storage area which stores programs and data in a non-volatile manner. The publisher storage 120 further includes a volatile storage area and may configure a work area which temporarily store programs to be executed by the publisher processor 110 and data of a process target.

The publisher communicator 101 includes communication hardware according to a prescribed communication standard and is controlled by the publisher controller 100 to communicate with the control device 2. Examples of the communication hardware include a communication circuit and hardware such as a communication port, a communication substrate, and a communication connector. A communication standard used between the publisher communicator 101 and the control device 2 may be a standard according to wired communication or may be a standard according to wireless communication, and in the present embodiment, a USB standard is illustrated.

The data recorder 102 is a function unit configured to record data on the recording surface of a blank medium MB and includes the first media drive 20A and the second media drive 20B. Note that the data recorder 102 may be a function unit configured to read data from a medium M. Based on control by the publisher controller 100, the data recorder 102 records data on one blank medium MB by either the first media drive 20A or the second media drive 20B.

The printing unit 103 is a function unit configured to print an image onto a label surface of a blank medium MB or a label surface of a medium M on which no image is printed. The printing unit 103 includes printing-related components, for example, the label printer 30 and an ink supply unit configured to supply ink to the label printer 30, and the printing unit 103 prints an image onto the label surface of the medium M in accordance with the control by the publisher controller 100. Note that the printing unit may be referred to as a printing mechanism.

The transporter 60 includes the arm 61, the guide 62, the arm driver 63, the media holder 64, a driver configured to drive the media holder 64, and other components relating to transportation of media M, and in accordance with the control by the publisher controller 100, the transporter 60 transports the medium M.

Figure 4:
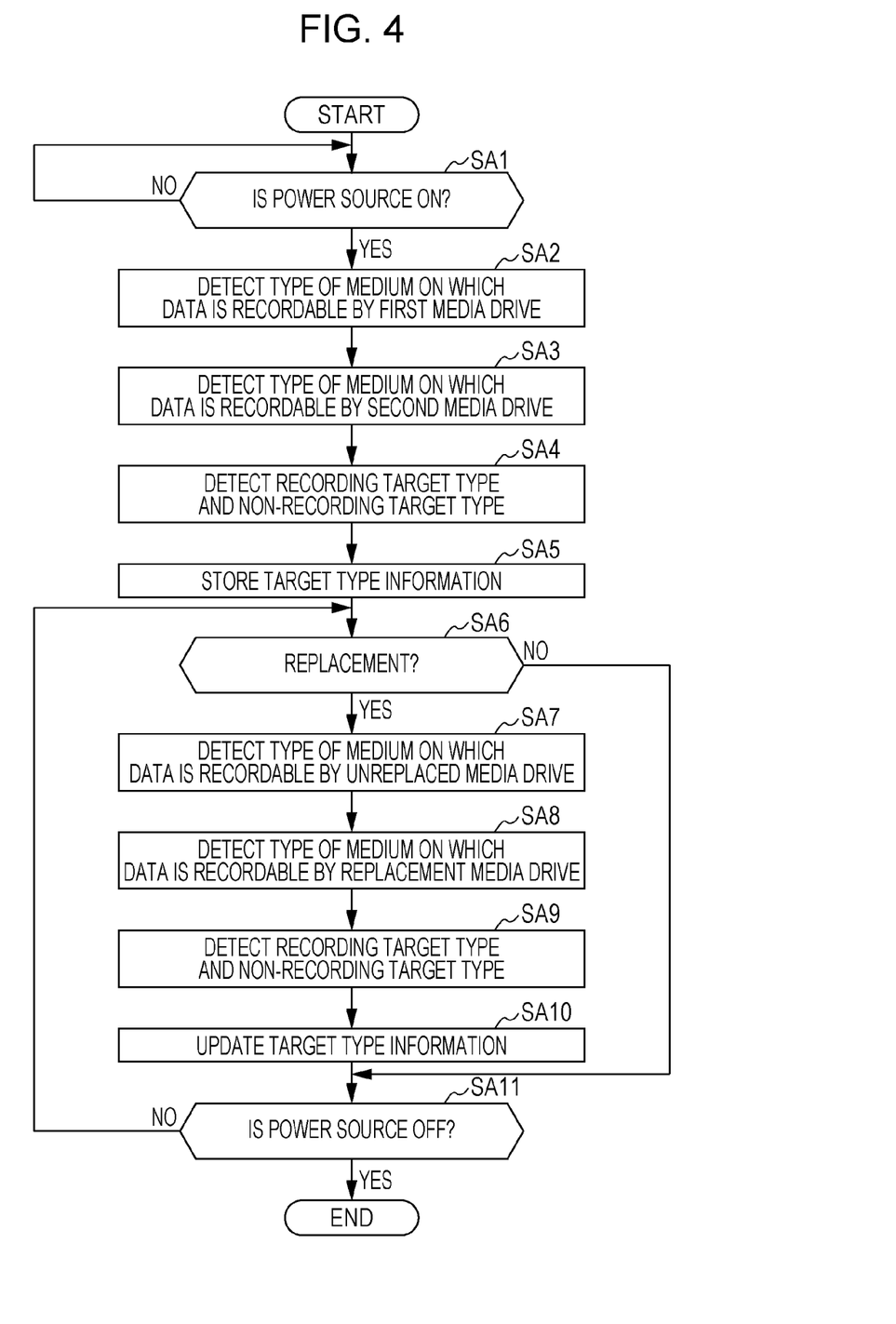
FIG. 4 is a flowchart illustrating operation of the publisher.

Next, operation of the publisher 1 will be described. Note that in the present operation, recording of processes including, for example, recording (writing) and reading by the first media drive 20A and the second media drive 20B will be described. A flowchart similar to the present operation will apply to the process of reading. FIG. 4 is a flowchart illustrating the operation of the publisher 1. At a starting point of time of the flowchart shown in FIG. 4, the power source of the publisher 1 is off.

The publisher controller 100 of the publisher 1 determines whether or not the power source of the publisher 1 is turned on (step SA1). The publisher controller 100 executes the process in step SA1 based on the on/off state of the power source switch 18.

When the publisher controller 100 determines that the power source of the publisher 1 is turned on (step SA1: YES), the publisher controller 100 detects a type of a medium M on which data is recordable (medium M on which data is recordable) by the first media drive 20A (step SA2).

For example, the publisher controller 100 transmits, to the first media drive 20A, a command that requests recordable media type information that represents the type of the medium M on which data is recordable by the first media drive 20A. Then, the publisher controller 100 detects the type of the medium M on which data is recordable by the first media drive 20A based on the recordable media type information received from the first media drive 20A. The recordable media type information is stored in advance in a prescribed storage area of the first media drive 20A. When the first media drive 20A is an apparatus which is configured to perform recording of CD data and DVD data, the first media drive 20A stores the recordable media type information representing the CD and the DVD in the prescribed storage area. In this case, the publisher controller 100 transmits the command to the first media drive 20A to receive the recordable media type information representing the CD and the DVD. Then, the publisher controller 100 determines, in step SA2, that the types of media M on which data is recordable by the first media drive 20A are CD and DVD.

The detection method is merely an example, and any method may be adopted as long as the method enables detection of the type of a medium M on which data is recordable. For example, the publisher controller 100 transmits, to the first media drive 20A, a command that requests the model number of the first media drive 20A to receive the model number of the first media drive 20A from the first media drive 20A. Then, the publisher controller 100 detects the type of the medium M on which data is recordable by the first media drive 20A by a prescribed method, for example, an inquiry to the control device 2, based on the model number received.

The publisher controller 100 executes the process in step SA2, and then, the publisher controller 100 detects a type of a medium M on which data is recordable (medium M on which data is recordable) by the second media drive 20B (step SA3). The publisher controller 100 executes the process in step SA3 in a similar method to the detection method described in step SA2.

Note that the processes in step SA2 and step SA3 are not limited in the order of step SA2 and SA3 but may be performed in reverse order or in parallel with each other.

Next, the publisher controller 100 detects a recording target type (target medium) and a non-recording target type (non-target medium) based on the detection results in steps SA2 and SA3 (step S4A).

The recording target type refers to the type of a medium M (or a medium M) on which data is to be recorded when recording of the data by the publisher 1 is performed. In step SA4, the recording target types are the types of media M on which data is recordable by the first media drive 20A and the second media drive 20B. For example, when data is recordable on CDs and DVDs by both the first media drive 20A and the second media drive 20B, the recording target types are CD and DVD.

The non-recording target type refers to the type of a medium M (or a medium M) on which data is not to be recorded when recording of data by the publisher 1 is performed. In step SA4, the recording target type is the type of a medium M on which data is recordable by only one of the first media drive 20A and the second media drive 20B. For example, when the first media drive 20A is configured to record data on only CDs and DVDs, and when the second media drive 20B is configured to record data on CDs, DVDs, and BDs, the non-recording target type is BD.

For example, it is assumed that the detection result in step SA2 corresponds to CD and DVD, and the detection result in step SA3 corresponds to CD, DVD, and BD. In this case, the publisher controller 100 detects CD and DVD as the recording target types and detects BD as the non-recording target type. Alternatively, for example, it is assumed that the detection result in step SA2 corresponds to CD, DVD, and BD, and the detection result in step SA3 correspond to CD, DVD, and BD. In this case, the publisher controller 100 detects CD, DVD, and BD as the recording target types and detects that there is no non-recording target type.

When the publisher controller 100 detects the recording target type and the non-recording target type, the publisher controller 100 stores target type information 120B representing the recording target type and the non-recording target type thus detected in the publisher storage 120 (step SA5).

For example, it is assumed that in step SA4, CD and DVD are detected as the recording target types, and BD is detected as the non-recording target type. In this case, the publisher controller 100 stores target type information 120B representing the recording target types representing CD and DVD and the non-recording target type representing BD in the publisher storage 120.

Next, the publisher controller 100 determines whether or not any one of the first media drive 20A and the second media drive 20B is replaced with another media drive 20 (step SA6). The another media drive 20 corresponds to an example of a third data recorder. Note that the another media drive 20 is a media drive 20 different from both the first media drive 20A and the second media drive 20B. The publisher 1 is provided with a sensor configured to detect attachment/detachment of each of two media drives 20. The publisher controller 100 determines, based on an output of the sensor, whether or not any one of the first media drive 20A and the second media drive 20B is replaced.

When the publisher controller 100 determines that any one of the first media drive 20A and the second media drive 20B is not replaced with another media drive 20, (step SA6: NO), the publisher 100 determines whether or not the power source of the publisher 1 is turned off (step SA11).

When the publisher controller 100 determines that the power source of the publisher 1 is not turned off (step SA11: NO), the process returns to step SA6. In contrast, when the publisher controller 100 determines that the power source of the publisher 1 is turned off (step SA11: YES), the process ends.

Returning to the description of step SA6, when the publisher controller 100 determines that any one of the first media drive 20A and the second media drive 20B is replaced with another media drive 20 (step SA6: YES), the publisher controller 100 detects the type of a medium M on which data is recordable by the media drive 20 which is an unreplaced media drive (step SA7). In step SA7, the publisher controller 100 performs the detection by a detection method similar to that in step SA2.

Then, the publisher controller 100 detects the type of a medium M on which data is recordable by the another media drive 20 which is a replacement media drive (step SA8). In step SA8, the publisher controller 100 performs the detection by a detection method similar to that in step SA2.

Note that the processes in step SA7 and step SA8 are not limited in the order of step SA7 and SA8 but may be performed in reverse order or in parallel with each other. Alternatively, when the publisher storage 120 stores the detection result of the media drive 20 which is an unreplaced media drive, the publisher controller 100 may skip the process in step SA7.

Next, the publisher controller 100 detects a recording target type and a non-recording target type based on the detection results in steps SA7 and SA8 (step SA9).

For example, it is assumed that the detection result in step SA7 corresponds to CD and DVD, and the detection result in step SA8 corresponds to CD, DVD, and BD. In this case, the publisher controller 100 detects CD and DVD as the recording target types and detects BD as the non-recording target type. Alternatively, for example, it is assumed that the detection result in step SA7 corresponds to CD, DVD, and BD, and the detection result in step SA8 correspond to CD, DVD, and BD. In this case, the publisher controller 100 detects CD, DVD, and BD as the recording target types and detects that there is no non-recording target type.

When the publisher controller 100 detects the recording target type and the non-recording target type, the publisher controller 100 updates the target type information 120B stored in the publisher storage 120 to the target type information 120B representing the recording target type and the non-recording target type detected in step SA9 (step SA10).

For example, it is assumed that of the first media drive 20A and the second media drive 20B configured to record data on CDs and DVDs, the second media drive 20B is replaced with another media drive 20 configured to record data on CDs, DVDs, and BDs. In this case, the target type information 120B stored in the publisher storage 120 is updated to the target type information 120B representing the recording target types corresponding to CD and DVD and the non-recording target type corresponding to BD.

Then, the publisher controller 100 executes the process in step SA10, and then, the publisher controller 100 executes the process in step SA11.

As described above, the publisher controller 100 detects the recording target type and the non-recording target type at a timing at which the power source of the publisher 1 is turned on and at a timing at which the media drive 20 is replaced, and the publisher controller 100 stores the target type information 120B in the publisher storage 120. Note that detection, storage, update, and the like correspond to an example of acquisition.

The publisher 1 of the present embodiment executes the operation shown in FIG. 4 to processes a blank medium MB based on the target type information 120B stored in the publisher storage 120, thereby issuing a processed medium MS.

Figure 5:
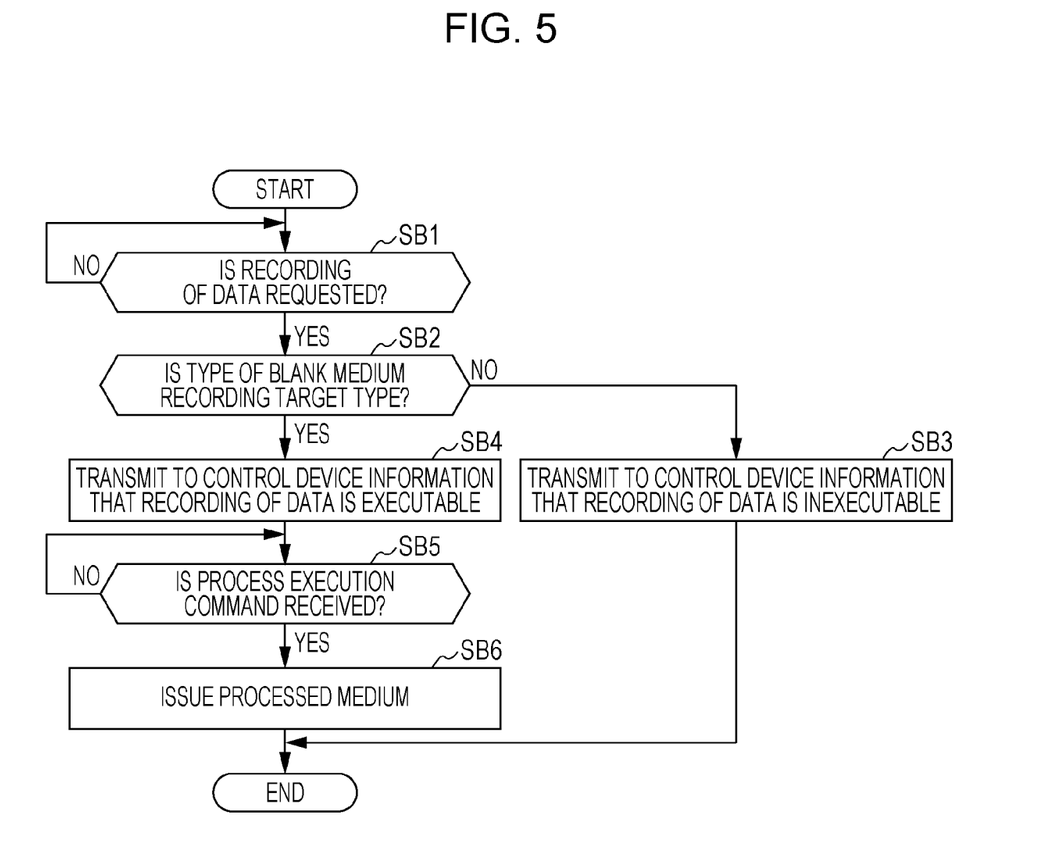
FIG. 5 is a flowchart illustrating operation of the publisher.

FIG. 5 is a flowchart illustrating the operation of the publisher 1. Note that in a similar manner to FIG. 4, in the present operation, recording of processes including, for example, recording (writing) and reading by the first media drive 20A and the second media drive 20B will be described. A flowchart similar to the present operation will apply to the process of reading. In FIG. 5, it is assumed that the power source of the publisher 1 is on. It is assumed that at a starting point of time of the flowchart shown in FIG. 5, a blank medium MB is stored at least in the first stacker 40A or the second stacker 40B.

The publisher controller 100 of the publisher 1 determines whether or not recording of data on the blank medium MB is requested from the control device 2 via the publisher communicator 101 (step SB1).

For example, it is assumed that the control device 2 is configured to set the type of the blank medium MB to be processed by the publisher by the function of a preinstalled program. In this case, the control device 2 transmits, to a publisher 1, request information including information representing the type of the blank medium MB thus set. Then, when the publisher controller 100 receives the request information, the publisher controller 100 determines that recording of data on the blank medium MB is requested by the control device 2.

When the publisher controller 100 of the publisher 1 determines that the recording of data is requested (step SB1: YES), the publisher controller 100 determines whether or not the type of the blank medium MB as the process target is the recording target type represented by the target type information 120B stored in the publisher storage 120 (step SB2). The publisher controller 100 executes the determination in step SB2 based on the type of the blank medium MB represented by the request information received from the control device 2.

When the type of the blank medium MB represented by the request information is not the recording target type represented by the target type information 120B, that is, when the type of the blank medium MB represented by the request information is the non-recording target type represented by the target type information 120B, the publisher controller 100 transmits information that recording of data is inexecutable to the control device 2 via the publisher communicator 101 (step SB3). Then, the publisher controller 100 terminates the process without executing the recording of the data on the blank medium MB.

In contrast, when the type of the blank medium MB represented by the request information is the recording target type represented by the target type information 120B (step SB2: YES), the publisher controller 100 transmits information that the recording of the data is executable to the control device 2 via the publisher communicator 101 (step SB4).

Next, the publisher controller 100 determines whether or not a process execution command that instructs execution of the process on the blank medium MB is received (step SB5).

When the publisher controller 100 determines that the process execution command is received (step SB5: YES), the publisher controller 100 controls the data recorder 102, the printing unit 103, and the transporter 60 based on the process execution command to issue one or a plurality of processed media MS (step SB6).

Here, operation of the publisher 1 in a case where the plurality of processed media MS are issued in step SB6 will be described. Note that the publisher 1 executes the process in accordance with the process execution command received from the control device 2. The process execution command is data specified by the control device 2 and includes various types of data such as data to be recorded on recording surfaces of blank media MB, image data of an image to be printed onto label surfaces of the blank media MB, and data representing the number of media to be issued. Moreover, the process execution command includes various types of commands such as a command that instructs transportation by the transporter 60, a command that instructs the media drive 20 to record data, and a command that instructs printing by the label printer 30.

The publisher 1 transports one of the blank media MB accommodated in the first stacker 40A or the second stacker 40B by the transporter 60 to any one of the two media drives 20 and starts recording of data by the any one of the two media drives 20. Then, the publisher 1 further transports another one of the blank media MB accommodated in the first stacker 40A or the second stacker 40B by the transporter 60 to a media drive 20 which is not performing recording, and the publisher 1 starts recording of data. As described above, recording of data is executable on two blank media MB at the same time, and therefore, the process efficiency is improved.

In the publisher 1, when the recording of data by any one of the media drives 20 ends, the transporter 60 takes out the medium M from the media drive 20 which ends the recording, the transporter 60 transports the medium M to the label printer 30, and the label printer 30 starts printing of an image onto the label surface. Here, when there is still another blank medium MB to be processed, the publisher 1 transports one of the blank media MB accommodated in the first stacker 40A or the second stacker 40B by the transporter 60 to a media drive 20 in which no blank medium MB is mounted, and the publisher 1 executes recording of data.

When the printing by the label printer 30 ends, the publisher 1 takes the processed media MS from the label printer 30 and accommodates them in the third stacker 50. Here, in the publisher 1, when the recording of data by any one of the media drives 20 ends, the transporter 60 takes out the medium M from the media drive 20 which ends the recording, the transporter 60 transports the medium M to the label printer 30, and the label printer 30 starts printing of an image onto the label surface. Then, when there is still another blank medium MB to be processed, the publisher 1 repeats the transportation to the media drive 20 and the recording of data, and the transportation to the label printer 30 and the printing of an image onto the label surface.

As described above, the publisher 1 issues the plurality of processed media MS by the operation of the transporter 60, the first media drive 20A, the second media drive 20B, and the label printer 30.

As described above, the publisher 1 is configured to record (execute process of recording and reading of) data on a medium M by the first media drive 20A and the second media drive 20B. The publisher 1 includes: the publisher controller 100 configured to control the first media drive 20A and the second media drive 20B; and the publisher storage 120. The publisher controller 100 detects a medium M on which data is recordable by the first media drive 20A and detects a medium M on which data is recordable by the second media drive 20B. Moreover, the publisher controller 100 defines, based on the detection result, that a medium M on which data is recordable by the first media drive 20A and the second media drive 20B is of the recording target type representing a medium M to which the data is to be recorded. Moreover, the publisher controller 100 defines, based on the detection result, that a medium M on which data is recordable by only one of the first media drive 20A and the second media drive 20B is of the non-recording target type representing a medium M to which the data is not to be recorded. Then, the publisher controller 100 stores target type information 120B representing the recording target type and the non-recording target type in the publisher storage 120.

With this configuration, when the medium M on which data is recordable is different between the first media drive 20A and the second media drive 20B, the publisher 1 limits the types of media M to which the data is to be recorded to the types of media M to which the data is recordable by the two media drives 20. Thus, the publisher 1 enables a prevention or reduction of the occurrence of such a situation where when the medium M on which data is recordable is different between the first media drive 20A and the second media drive 20B, the medium M is processable by only one of the first media drive 20A and the second media drive 20B. Thus, also when the medium M on which data is recordable is different between the first media drive 20A and the second media drive 20B, the publisher 1 enables data to be recorded on the medium M without reducing the process efficiency.

When the first media drive 20A or the second media drive 20B is replaced with another media drive 20, the publisher controller 100 detects the type of a medium M on which data is recordable by the another media drive 20, and the publisher controller 100 updates the target type information 120B recorded in the publisher storage 120 based on the detection result.

With this configuration, also when the first media drive 20A or the second media drive 20B is replaced with another media drive 20, the publisher 1 enables the type of a medium M on which data is to be recorded and the type of a medium M on which data is not to be recorded to be appropriately updated. Thus, also when the first media drive 20A or the second media drive 20B is replaced with another media drive 20, the publisher 1 enables data to be recorded on the medium M without reducing the process efficiency.

When recording of data on a medium M by the first media drive 20A or the second media drive 20B is requested, the publisher controller 100 executes the recording of the data by the first media drive 20A or the second media drive 20B in a case where the type of the medium M requested is the recording target type, and the publisher controller 100 does not execute the recording of the data by the first media drive 20A or the second media drive 20B in a case where the type of the medium M requested is the non-recording target type.

With this configuration, when the type of the medium M on which data is recordable is different between the first media drive 20A and the second media drive 20B, the publisher 1 does not have to have a configuration that executes operation according to media M whose types are not common. Thus, also when the medium M on which data is recordable is different between the first media drive 20A and the second media drive 20B, the publisher 1 enables operation to be prevented or suppressed from becoming complicated.

Second Embodiment

Figure 6:
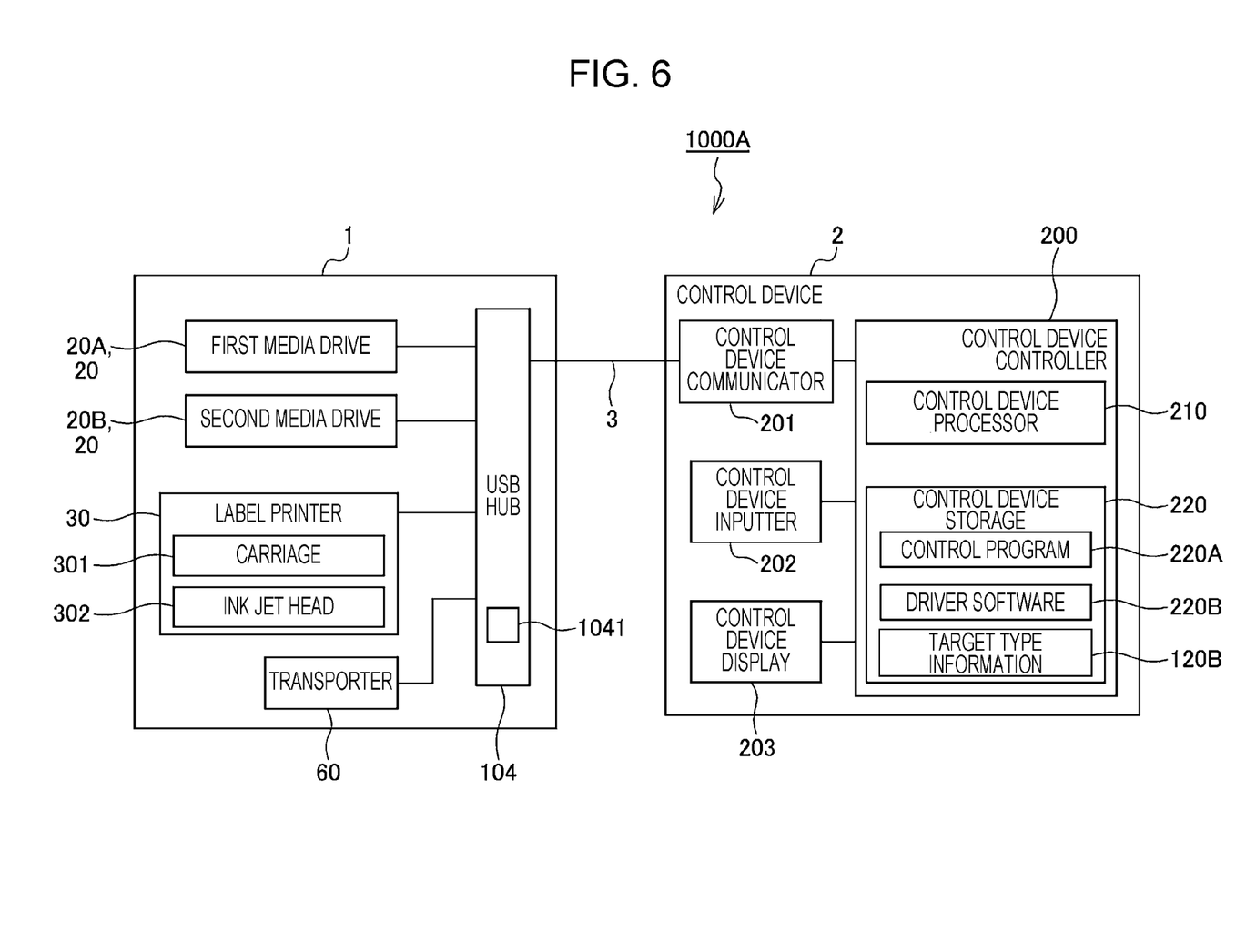
FIG. 6 is a view illustrating a configuration of a media processing system.

Next, a second embodiment will be described. FIG. 6 is a view illustrating a configuration of a media processing system 1000A of the second embodiment. When configurations of components of a publisher 1 and a control device 2 of the second embodiment are the same as those in the first embodiment, the components of the second embodiment are denoted by the same reference symbols as those in the first embodiment, and the detailed description thereof will be omitted.

As clearly seen from a comparison with the publisher 1 of the first embodiment, the publisher 1 of the second embodiment includes a USB hub 104.

The USB hub 104 is a communication interface that communicatively connects the control device 2 to a first media drive 20A, a second media drive 20B, a label printer 30, and a transporter 60. The USB hub 104 includes a USB hub controller 1041 which distributes commands and/or data to be output to the first media drive 20A, the second media drive 20B, the label printer 30, and the transporter 60. The first media drive 20A, the second media drive 20B, the label printer 30, and the transporter 60 included in the publisher 1 are connected to the control device 2 via the USB hub 104 by a USB cable 3.

The control device 2 includes a control device controller 200, a control device communicator 201, a control device inputter 202, and a control device display 203.

The control device controller 200 includes a control device processor 210 serving as a processor, such as CPU or MPU, configured to execute a program and a control device storage 220 and is configured to control components in the control device 2. The control device controller 200 executes various processes through cooperation of hardware and software such that the control device processor 210 reads a control program 220A stored in the control device storage 220, driver software 220B, and the like to execute a process.

The control device storage 220 includes a storage area which stores programs to be executed by the control device processor 210 and data to be processed by the control device processor 210. The control device storage 220 stores the control program 220A to be executed by the control device processor 210, the driver software 220B, target type information 120B, and various types of other data. The driver software 220B is a program that causes the control device processor 210 to execute operation illustrated in FIGS. 7 and 8. The control device storage 220 includes a non-volatile storage area which non-volatilely stores programs and data. Alternatively, the control device storage 220 may include a volatile storage area to configure a work area which temporarily stores a program to be executed by the control device processor 210 and data as a process target.

The control device communicator 201 includes communication hardware according to a USB communication standard and is controlled by the control device controller 200 to communicate with the controller 1. Note that a communication standard based on which the control device communicator 201 communicates with the publisher 1 is not limited to the USB communication standard.

The control device inputter 202 includes an input unit such as an operation switch provided to the control device 2 or a keyboard or a touch panel connected to the terminal apparatus 2. The control device inputter 202 detects an operation given to the input unit by a user who operates the control device 2 and outputs the operation to the control device controller 200. The control device controller 200 executes, based on the input from the control device inputter 202, a process corresponding to the operation given to the input unit.

The control device display 203 includes a display panel such as a liquid crystal display panel and displays various types of information in accordance with control by the control device controller 200.

Figure 7:
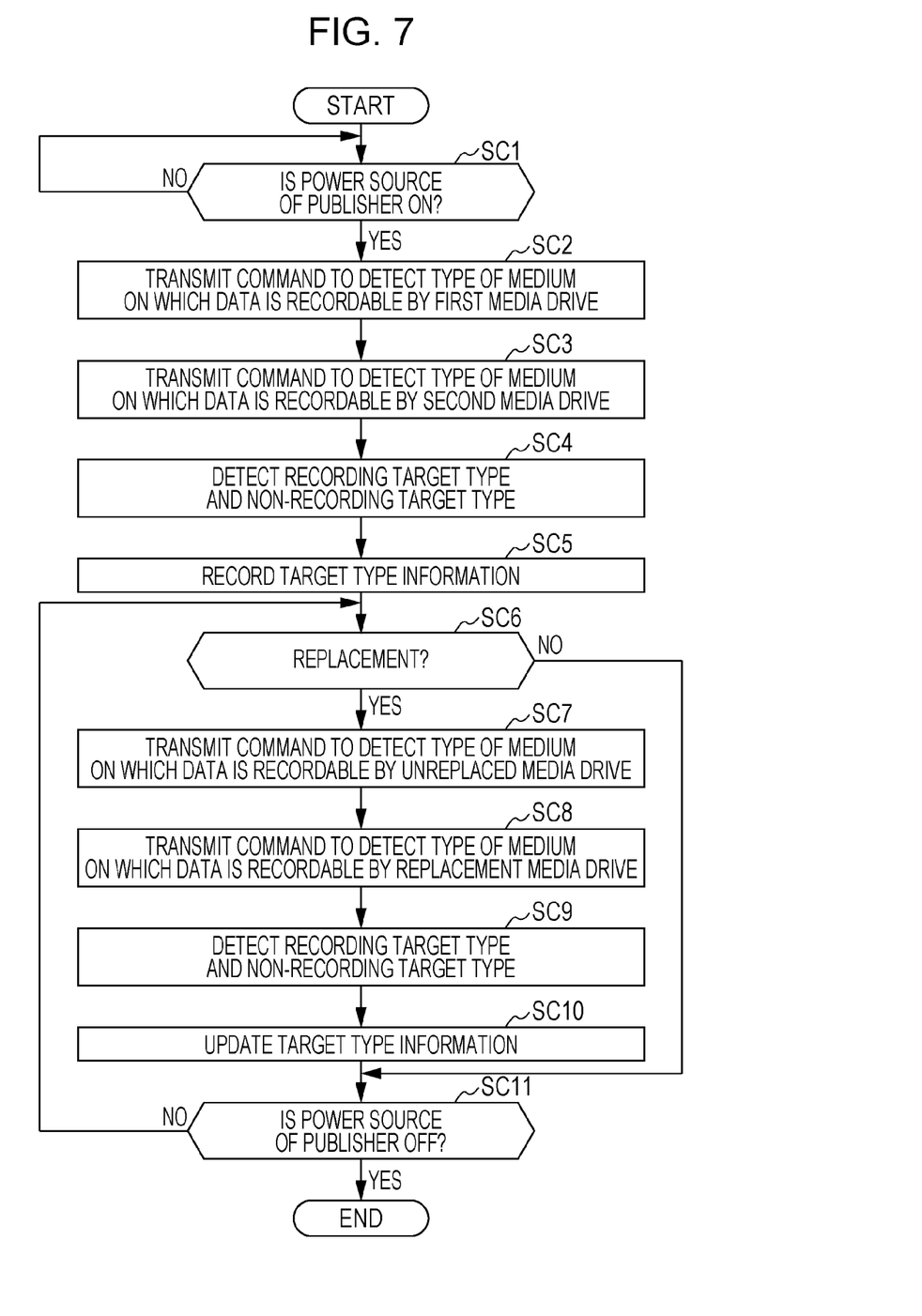
FIG. 7 is a flowchart illustrating operation of a control device.

FIG. 7 is a flowchart illustrating operation of the control device 2.

FIG. 7 is a flowchart illustrating operation of the control device 2. At a starting point of time of the flowchart shown in FIG. 7, the power source of the publisher 1 is off.

The control device controller 200 of the control device 2 determines whether or not the power source of the publisher 1 is turned on (step SC1). For example, when the publisher 1 is configured to transmit a signal representing an on/off state of the power source switch 18 to the control device 2 via the USB hub 104, the control device controller 200 executes the process of step SC1 based on the signal.

When the control device controller 200 determines that the power source of the publisher 1 is turned on (step SC1: YES), the control device controller 200 transmits a command to the publisher 1 via the control device communicator 201 and detects the type of a medium M on which data is recordable by the first media drive 20A (step SC2). The command is, for example, a command that requests recordable medium information and/or a model number and that is used to detect the type of the medium M on which data is recordable. Based on a response to the command thus transmitted, the control device controller 200 detects the type of the medium M on which data is recordable by the first media drive 20A.

Then, the control device controller 200 transmits a command to the publisher 1 via the control device communicator 201 to detect a medium M on which data is recordable by the second media drive 20B (step SC3). The command is, for example, a command that requests recordable medium information and/or a model number and that is used to detect the type of the medium M on which data is recordable. Based on a response to the command thus transmitted, the control device controller 200 detects the type of the medium M on which data is recordable by the second media drive 20B.

Note that the processes in step SC2 and step SC3 are not limited in the order of step SC2 and SC3 but may be performed in reverse order or in parallel with each other.

Next, based on the detection results in steps SC2 and SC3, the control device controller 200 detects a recording target type and a non-recording target type (step SC4).

When the control device controller 200 detects the recording target type and the non-recording target type, the control device controller 200 stores target type information 120B representing the recording target type and the non-recording target type thus detected in the control device storage 220 (step SC5).

Next, the control device controller 200 determines whether or not any one of the first media drive 20A and the second media drive 20B is replaced with another media drive 20 (step SC6). The publisher 1 is provided with a sensor configured to detect attachment/detachment of each of two media drives 20. The publisher 1 transmits a detection value of the sensor to the control device 2 via the USB hub 104. The control device controller 200 determines whether or not any one of the first media drive 20A and the second media drive 20B is replaced based on the detection value thus received.

When the control device controller 200 determines that any one of the first media drive 20A and the second media drive 20B is not replaced with another media drive 20, (step SC6: NO), the control device controller 200 determines whether or not the power source of the publisher 1 is turned off (step SC11).

When the control device controller 200 determines that the power source of the publisher 1 is not turned off (step SC11: NO), the process returns to step SC6. In contrast, when the control device controller 200 determines that the power source of the publisher 1 is turned off (step SC11: YES), the process ends.

Returning to the description of step SC6, when the control device controller 200 determines that any one of the first media drive 20A and the second media drive 20B is replaced with another media drive 20 (step SC6: YES), the control device controller 200 transmits a command to the publisher 1 via the control device communicator 201 to detect the type of a medium M on which data is recordable by the media drive 20 which is an unreplaced media drive (step SC7). The command is, for example, a command that requests recordable medium information and/or a model number and that is used to detect the type of the medium M on which data is recordable. Based on a response to the command thus transmitted, the control device controller 200 detects the type of the medium M on which data is recordable by the media drive 20 which is the unreplaced media drive.

Then, a publisher controller 100 transmits the command to the publisher 1 via the control device communicator 201 and detects a medium M on which data is recordable by the another media drive 20 which is a replacement media drive (step SC8). The command is, for example, a command that requests recordable medium information and/or a model number and that is used to detect the type of the medium M on which data is recordable. Based on a response to the command thus transmitted, the control device controller 200 detects the type of the medium M on which data is recordable by the another media drive 20 which is the replacement media drive.

Note that the processes in step SC7 and step SC8 are not limited in the order of step SC7 and SC8 but may be performed in reverse order or in parallel with each other. Alternatively, when the publisher storage 120 stores the detection result of the media drive 20 which is an unreplaced media drive, the control device controller 200 may skip the process in step SC7.

Next, the control device controller 200 detects a recording target type and a non-recording target type based on the detection results in steps SC7 and SC8 (step SC9).

When the control device controller 200 detects the recording target type and the non-recording target type, the control device controller 200 updates the target type information 120B stored in the control device storage 220 to the target type information 120B representing the recording target type and the non-recording target type detected in step SC9 (step SC10).

Then, the control device controller 200 executes the process in step SC10, and then, the control device controller 200 executes the process in step SC11.

As described above, the control device controller 200 detects the recording target type and the non-recording target type at a timing at which the power source of the publisher 1 is turned on and at a timing at which the media drive 20 is replaced, and the control device controller 200 stores the target type information 120B in the control device storage 220.

The control device 2 of the present embodiment executes the operation shown in FIG. 7 causes, based on the target type information 120B stored in the control device storage 220, the publisher 1 to process a blank medium MB to issue a processed medium MS.

Figure 8:
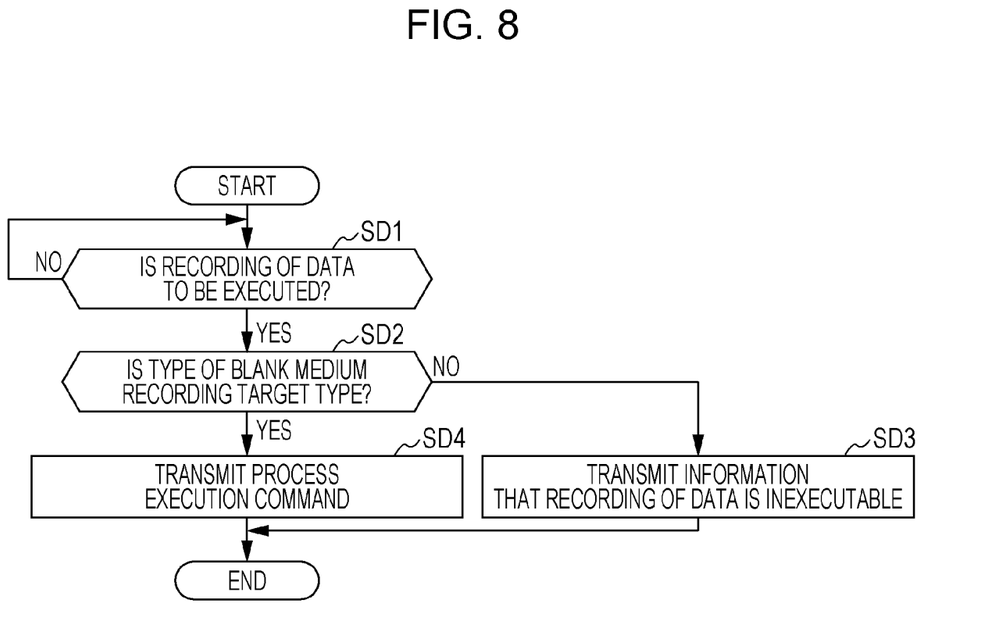
FIG. 8 is a flowchart illustrating operation of the control device.

FIG. 8 is a flowchart illustrating operation of the control device 2. In FIG. 8, it is assumed that the power source of the publisher 1 is on. It is assumed that at a starting point of time of the flowchart shown in FIG. 8, the blank medium MB is stored at least in the first stacker 40A or the second stacker 40B.

The control device controller 200 of the control device 2 determines whether or not to cause the publisher 1 to execute recording of data on the blank medium MB (step SD1).

For example, it is assumed that the control device 2 is provided with a user interface by a function of the driver software 220B, the user interface for giving an instruction to the publisher 1 to execute the recording of the data on the blank medium MB. In this case, when the instruction is given to the user interface, the control device 2 affirmatively determines in step SD1.

When the control device controller 200 of the control device 2 determines that the recording of data is to be executed (step SD1: YES), the control device controller 200 determines whether or not the type of the blank medium MB to be processed by the publisher 1 is the recording target type represented by the target type information 120B stored in the control device storage 220 (step SD2).

For example, it is assumed that the control device 2 is configured to set the type of the blank medium MB to be processed by the publisher 1 by the function of the driver software 220B. In this case, in step SD2, the control device 2 determines whether or not the type of the blank medium MB thus set is the recording target type represented by the target type information 120B stored in the control device storage 220.

When the type of the blank medium MB to be processed by the publisher 1 is not the recording target type represented by the target type information 120B, that is, when the blank medium MB to be processed is the non-recording target type represented by the target type information 120B, the control device controller 200 notifies by the control device display 203 that the recording of the data is inexecutable (step SD3). Then, the control device controller 200 terminates the process without causing the publisher 1 to execute the recording of the data on the blank medium MB.

In contrast, when the type of the blank medium MB to be processed by the publisher 1 is the recording target type represented by the target type information 120B (step SD2: YES), the control device controller 200 transmits a process execution command for instructing execution of processing of the blank medium MB to the publisher 1 via the control device communicator 201 (step SD4). Upon transmission of the process execution command, the publisher 1 processes one or a plurality of blank media MB to issue the one or a plurality of processed media MS. Note that the control device display 203 may notify that the recording of data is executable. Moreover, notification, transmission, and the like correspond to an example of outputting.

As described above, in the second embodiment, the control device 2 executes a process regarding two media drives 20 included in the publisher 1. The configuration of the second embodiment also provides a similar effect to the first embodiment.

Each of the above-described embodiments is merely an aspect of the present disclosure and may be accordingly modified and applied within the scope of the present disclosure.

It is not limited to that the publisher 1 includes the first data recorder or the second data recorder, but the publisher 1 may include more data recorders (a plurality of data recorders). In this case, data recording media on which processing of data is executable by a plurality of data recorders are detected, and based on the detection result, the data recording media on which the processing of data is executable by all of the plurality of the data recorders are defined as target media on which data is to be processed, and based on the detection result, the data recording media on which the processing of data is inexecutable by one data recorder of the plurality of data recorders are defined as the non-target media on which data is not to be processed.

For example, in accordance with the standards of CDs, DVDs, and BDs, the publisher controller 100 and the control device controller 200 may be configured to detect the recording target type and the non-recording target type.

For example, the process execution command may be included in request information that requests recording of data, and the request information may be transmitted.

Moreover, functions of the publisher controller 100 and the control device controller 200 may be realized by a plurality of processors or a semiconductor chip.

Moreover, each component shown in FIGS. 3 and 6 is a mere example, and specific embodiments thereof are not particularly limited. That is, hardware corresponding individually to each component does not necessarily have to be mounted, but one processor may be configured execute a program to realize respective functions. Moreover, in the above-described embodiments, some of functions realized by software may be realized by hardware, or some of the functions realized by hardware may be realized by software. Specific detailed configuration of other components than the publisher 1 and the control device 2 may also be accordingly modified without departing from the spirit of the present disclosure.

Moreover, step units of operation shown in, for example, FIGS. 4, 5, 7, and 8 are obtained by division in accordance with main process contents for ease of understanding of operation of each component in the publisher 1 and the control device 2, and a method for the division of and names of the process units do not limit the present disclosure. In accordance with the process contents, step units may be divided into a larger number of step units. Moreover, one step unit may be divided to include further increased number of processes. The order of the steps may be changed accordingly without departing from the scope of the present disclosure.

What is claimed is:

1. A printer configured to perform data processing on a data recording medium by a first data recorder and a second data recorder, the printer comprising:
a controller configured to control the first data recorder and the second data recorder,
the controller being configured to
acquire, as a target medium, a data recording medium which is a process target of both the first data recorder and the second data recorder and
acquire, as a non-target medium, a data recording medium which is not a process target of at least one of the first data recorder or the second data recorder.

2. The printer according to claim 1, wherein
the controller is configured to, when the first data recorder is replaced with a third data recorder,
acquire, as a target medium, a data recording medium which is a process target of both the second data recorder and the third data recorder and
acquire, as a non-target medium, a data recording medium which is not a process target of at least one of the second data recorder or the third data recorder.

3. The printer according to claim 1, wherein
the controller is configured to, when the controller receives a request of processing of data by the first data recorder and the second data recorder,
output information that the processing of data is executable when the request of the processing is a request of processing of the target medium, and
output information that the processing of data is inexecutable when the request of the processing is a request of processing of the non-target medium.

4. A control method of a printer configured to perform data processing on a data recording medium by a first data recorder and a second data recorder, the control method comprising:
acquiring, as a target medium, the data recording medium which is a process target of both the first data recorder and the second data recorder; and
acquiring, as a non-target medium, the data recording medium which is not a process target of at least one of the first data recorder or the second data recorder.

5. A printer configured to perform data processing on a data recording medium by a plurality of data recorder, the printer comprising:
a controller configured to control the plurality of data recorders,
the controller being configured to
acquire, as a target medium, the data recording medium which is a process target of all the plurality of data recorders and
acquire, as a non-target medium, the data recording medium which is not a process target of at least one of the plurality of data recorders.

* * * * *